(12) United States Patent
Zheng et al.

(10) Patent No.: US 10,572,234 B2
(45) Date of Patent: Feb. 25, 2020

(54) APP PROGRAM RUNNING METHOD AND APPARATUS

(71) Applicant: Alibaba Group Holding Limited, George Town (KY)

(72) Inventors: Yueyang Zheng, Hangzhou (CN); Yifeng Wu, Hangzhou (CN); Haoquan Bai, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/015,036

(22) Filed: Jun. 21, 2018

(65) Prior Publication Data

US 2018/0300118 A1 Oct. 18, 2018

Related U.S. Application Data

(63) Continuation of application No. PCT/CN2016/109917, filed on Dec. 14, 2016.

(30) Foreign Application Priority Data

Dec. 22, 2015 (CN) .......................... 2015 1 0971750

(51) Int. Cl.
*G06F 9/44* (2018.01)
*G06F 17/30* (2006.01)
(Continued)

(52) U.S. Cl.
CPC .............. *G06F 8/61* (2013.01); *G06F 8/4434* (2013.01); *G06F 9/44* (2013.01); *G06F 16/116* (2019.01);
(Continued)

(58) Field of Classification Search
CPC ... G06F 8/20; G06F 8/24; G06F 8/315; G06F 8/48; G06F 8/71; G06F 8/41; G06F 11/36;
(Continued)

(56) References Cited

U.S. PATENT DOCUMENTS 5,560,009 A * 9/1996 Lenkov ..................... G06F 8/41
714/E11.209
5,854,932 A * 12/1998 Mariani ..................... G06F 8/48
717/116

(Continued)

FOREIGN PATENT DOCUMENTS

CN 1514361 7/2004
CN 101783075 7/2010
(Continued)

OTHER PUBLICATIONS

David M. Beazley, SWIG: An Easy to Use Tool for Integrating Scripting Languages with C and C++, Jul. 1996, [Retrieved on Oct. 8, 2019]. Retrieved from the internet: <URL: https://www.usenix.org/legacy/publications/library/proceedings/tcl96/full_papers/beazley/> 19 Pages (1-19) (Year: 1996).*

(Continued)

*Primary Examiner* — Anibal Rivera
(74) *Attorney, Agent, or Firm* — Fish & Richardson P.C.

(57) ABSTRACT

A class description file describing a class associated with an application (APP) is generated based on an original file of the APP. The class description file is added to an installation package associated with the APP. Prior to execution of the APP, the installation package is downloaded. During the execution of the APP, the class description file is obtained from the installation package. The class associated with the APP is generated based on the class description file.

17 Claims, 7 Drawing Sheets

(51) Int. Cl.
  *G06F 8/61*   (2018.01)
  *G06F 16/11*  (2019.01)
  *G06F 16/16*  (2019.01)
  *G06F 8/41*   (2018.01)
  *G06F 9/455*      (2018.01)
  *G06F 8/20*       (2018.01)
  *G06F 8/30*       (2018.01)

(52) U.S. Cl.
  CPC .......... *G06F 16/162* (2019.01); *G06F 16/164* (2019.01); *G06F 8/24* (2013.01); *G06F 8/315* (2013.01); *G06F 9/455* (2013.01)

(58) Field of Classification Search
  CPC .......... G06F 9/4488; G06F 17/30; G06F 9/44; G06F 9/45
  See application file for complete search history.

(56) References Cited

U.S. PATENT DOCUMENTS

| | | | | |
|---|---|---|---|---|
| 6,085,198  | A  * | 7/2000  | Skinner ................ | G06F 8/315 |
| 7,184,917  | B2 * | 2/2007  | Pramanick ......... | G01R 31/3183 |
| | | | | 702/108 |
| 7,509,584  | B2 * | 3/2009  | Moser .................. | G06F 8/38 |
| | | | | 704/3 |
| 7,912,935  | B2 * | 3/2011  | Merissert-Coffinieres ............. | |
| | | | | G06F 8/00 |
| | | | | 709/218 |
| 8,275,540  | B2   | 9/2012  | Downs et al. | |
| 2002/0093856 | A1 * | 7/2002 | Baentsch ............ | G06F 9/44589 |
| | | | | 365/200 |
| 2004/0006762 | A1 * | 1/2004 | Stewart ................ | G06F 8/36 |
| | | | | 717/106 |
| 2004/0172407 | A1 * | 9/2004 | Arpirez Vega ........ | G06F 8/65 |
| 2004/0268309 | A1 * | 12/2004 | Grover ................ | G06F 8/20 |
| | | | | 717/120 |
| 2005/0022161 | A1 * | 1/2005 | Burger ................ | G06F 9/4488 |
| | | | | 717/108 |
| 2005/0268243 | A1 * | 12/2005 | Moser .................. | G06F 8/38 |
| | | | | 715/760 |
| 2006/0048097 | A1 * | 3/2006 | Doshi .................. | G06F 8/24 |
| | | | | 717/120 |
| 2006/0101038 | A1 * | 5/2006 | Gabriel ................ | G06F 8/71 |
| 2007/0169043 | A1 * | 7/2007 | Violleau ................ | G06F 9/526 |
| | | | | 717/149 |
| 2008/0222198 | A1 * | 9/2008 | Wilkinson ............ | G06F 8/4434 |
| 2009/0125879 | A1 * | 5/2009 | Miloushev ................ | G06F 8/24 |
| | | | | 717/108 |
| 2009/0172636 | A1 * | 7/2009 | Griffith ................ | G06F 8/20 |
| | | | | 717/113 |
| 2010/0211930 | A1 * | 8/2010 | Zhang .................. | H04L 1/0233 |
| | | | | 717/115 |
| 2011/0153697 | A1 * | 6/2011 | Nickolov .............. | G06F 9/4856 |
| | | | | 707/827 |
| 2012/0210312 | A1 * | 8/2012 | Ma ........................ | G06F 8/65 |
| | | | | 717/170 |
| 2015/0220317 | A1 * | 8/2015 | Li .......................... | G06F 8/61 |
| | | | | 717/169 |

FOREIGN PATENT DOCUMENTS

| | | |
|---|---|---|
| CN | 102135892 | 7/2011 |
| CN | 102662703 | 9/2012 |
| CN | 102955689 | 3/2013 |
| CN | 10365672  | 10/2013 |
| TW | I559249   | 11/2016 |
| TW | M553462   | 12/2017 |
| TW | M560648   | 5/2018 |

OTHER PUBLICATIONS

Martin Wollschlaeger, A Framework for Fieldbus Management Using XML Descriptions, IEEE 2000, [Retrieved on Oct. 8, 2019]. Retrieved from the internet: <URL: https://ieeexplore.ieee.org/stamp/stamp.jsp?tp=&arnumber=882527> 10 Pages (1-10) (Year: 2000).*
International Preliminary Report on Patentability in International Application No. PCT/CN2016/109917, dated Jun. 26, 2018, 9 pages (with English Translation).
International Searching Report of the International Searching Authority issued in International Application No. PCT/CN2016/109917 dated Mar. 28, 2017; 10 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

APP PROGRAM RUNNING METHOD AND APPARATUS

This application is a continuation of PCT Application No. PCT/CN2016/109917, filed on Dec. 14, 2016, which claims priority to Chinese Patent Application No. 201510971750.8, filed on Dec. 22, 2015, and each application is hereby incorporated by reference in its entirety.

TECHNICAL FIELD

The present disclosure relates to the field of Internet technologies, and in particular, to an APP running method and apparatus.

BACKGROUND

In smart technology era, more and more applications (APPs) are used by users, and the APPs need to be downloaded and installed before using. Currently, installation package of the APP is usually large, for example, about 100 megabytes (M). When a user downloads an installation package from an APP store, large disk space of a terminal device is occupied. In addition, large download traffic and long download time are needed, increasing resource overheads.

SUMMARY

The present disclosure aims to resolve one of technical problems in a related technology at least to a certain extent.

Therefore, an objective of the present disclosure is to provide an application (APP) running method, and the method can reduce the size of an APP installation package, reducing resource overheads.

Another objective of the present disclosure is to provide an APP running apparatus.

To achieve the earlier described objectives, an APP running method proposed in an implementation of a first aspect of the present disclosure includes: generating a class description file based on an original file of an APP, and placing the class description file in an installation package, where the class description file is a text file used for class description, and the size of the class description file is smaller than the size of a corresponding class; downloading the installation package before a user runs the APP; and when the APP runs, obtaining the class description file from the installation package, and generating a class based on the class description file.

In the APP running method proposed in the implementation of the first aspect of the present disclosure, the installation package includes the class description file, and the size of the class description file is smaller than that of the class. Therefore, compared with an existing method of including a class directly in an installation package, including the class description file in the installation package can reduce the size of the APP installation package, reducing resource overheads.

To achieve the earlier described objectives, an APP running apparatus proposed in an implementation of a second aspect of the present disclosure includes: a generation module, configured to: generate a class description file based on an original file of an APP, and place the class description file in an installation package, where the class description file is a text file used for class description, and the size of the class description file is smaller than the size of a corresponding class; a download module, configured to download the installation package before a user runs the APP; and a running module, configured to: when the APP runs, obtain the class description file from the installation package, and generate a class based on the class description file.

In the APP running apparatus proposed in the implementation of the second aspect of the present disclosure, the installation package includes the class description file, and the size of the class description file is smaller than that of the class. Therefore, compared with an existing method of including a class directly in an installation package, including the class description file in the installation package can reduce the size of the APP installation package, reducing resource overheads.

Some additional aspects and advantages of the present disclosure are provided in the following descriptions, are apparent in the following descriptions, or are understandable through practice of the present disclosure.

BRIEF DESCRIPTION OF DRAWINGS

The earlier described and/or additional aspects and advantages of the present disclosure are apparent and comprehensible in the following descriptions of implementations with reference to the accompanying drawings.

DESCRIPTION OF EMBODIMENTS

Figure 1:
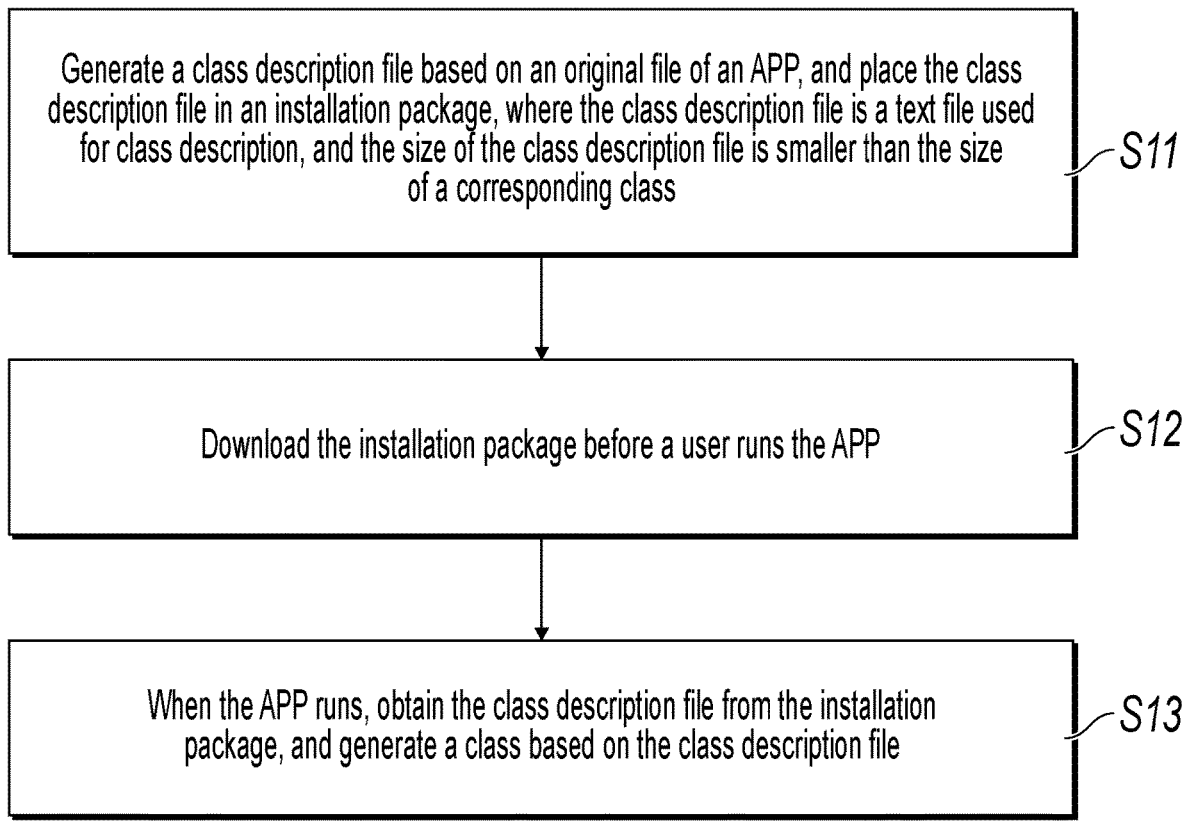
FIG. 1 is a schematic flowchart illustrating an APP running method, according to an implementation of the present disclosure.

The implementations of the present disclosure are described in detail below, and examples of the implementations are shown in the accompanying drawings. Same or similar reference numerals represent the same or similar modules or modules having the same or similar functions. The implementations described below with reference to the accompanying drawings are examples, intended for explaining the present disclosure, and should not be construed as a limitation of the present disclosure. On the contrary, the implementations of the present disclosure include all changes, modifications and equivalents falling within the spirit and scope of the appended claims.

FIG. 1 is a schematic flowchart illustrating an application (APP) running method, according to an implementation of the present disclosure. The method includes the following steps.

S11. Generate a class description file based on an original file of an APP, and place the class description file in an installation package, where the class description file is a text file used for class description, and the size of the class description file is smaller than the size of a corresponding class.

For example, the original file includes a header file (.h file) and a source file (.m file).

The class description file is a text file and used to describe related information of a class. Classes are basic information in computer programming. The size of the class description file is smaller than the size of a corresponding class.

For example, a class name (className) is cashier (MERCHANTAPPOperator), and the cashier has a class description (classDescription). The class description includes attribute description, which for example, can include a cashier ID (operatorId), a cashier name (operatorName), a shop name (shopName) of the cashier, etc.

Using the iOS as an example, a pre-compiled script can be used to convert the original file into the class description file (.plist file). Content needed in the class description file can be found in the original file, but the original file and the class description file have different formats. Therefore, the script can be pre-compiled to implement conversion between the original file and the class description file.

In addition, after the class description file is generated, it can be stored in a predetermined directory, such as a resource bundle.

After the class description file is generated, it can be placed in the installation package for a user to download and install.

Figure 2:
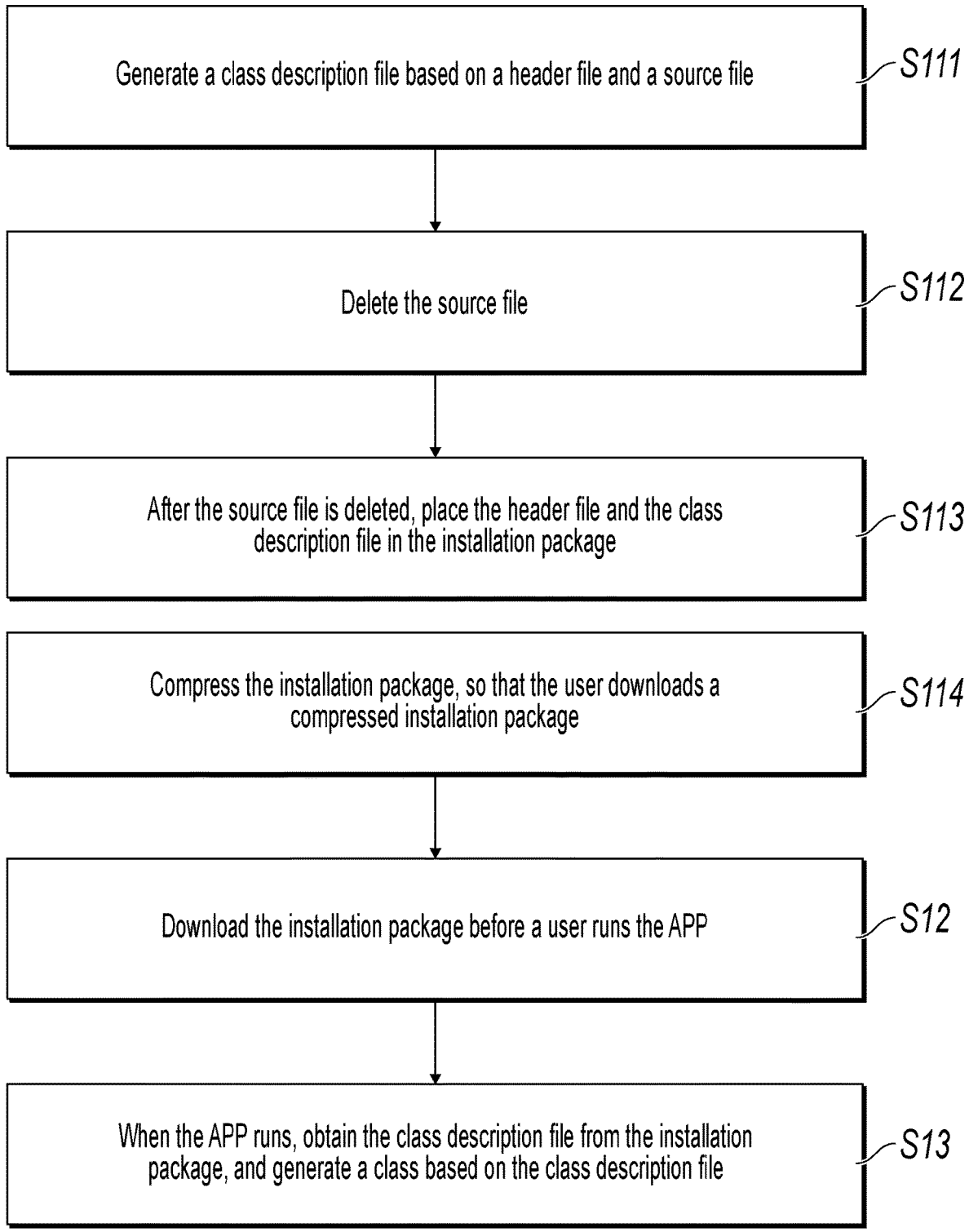
FIG. 2 is a schematic diagram illustrating an APP running method in the existing technology.

In some implementations, referring to FIG. 2, the generating a class description file based on an original file of an APP, and placing the class description file in an installation package includes the following steps.

S111. Generate the class description file based on a header file and a source file.

For a generation procedure, refer to the earlier described related description. Details are not described herein again.

S112. Delete the source file.

S113. After the source file is deleted, place the header file and the class description file in the installation package for the user to download.

Because the class description file and the header file are both small, and the obtained installation package is also small, the user can directly download the installation package from the APP store.

Optionally, to further reduce the size of the installation package, the obtained installation package can be further compressed. For example, after the header file and the class description file are included in the installation package, the method can further include the following steps.

S114. Compress the installation package, so that the user downloads a compressed installation package.

For example, the compressed installation package is presented in the APP store, and the user can download the compressed installation package.

S12. Download the installation package before a user runs the APP.

For example, the user can download the installation package of the APP from the APP store, and the installation package includes the class description file.

Figure 3:
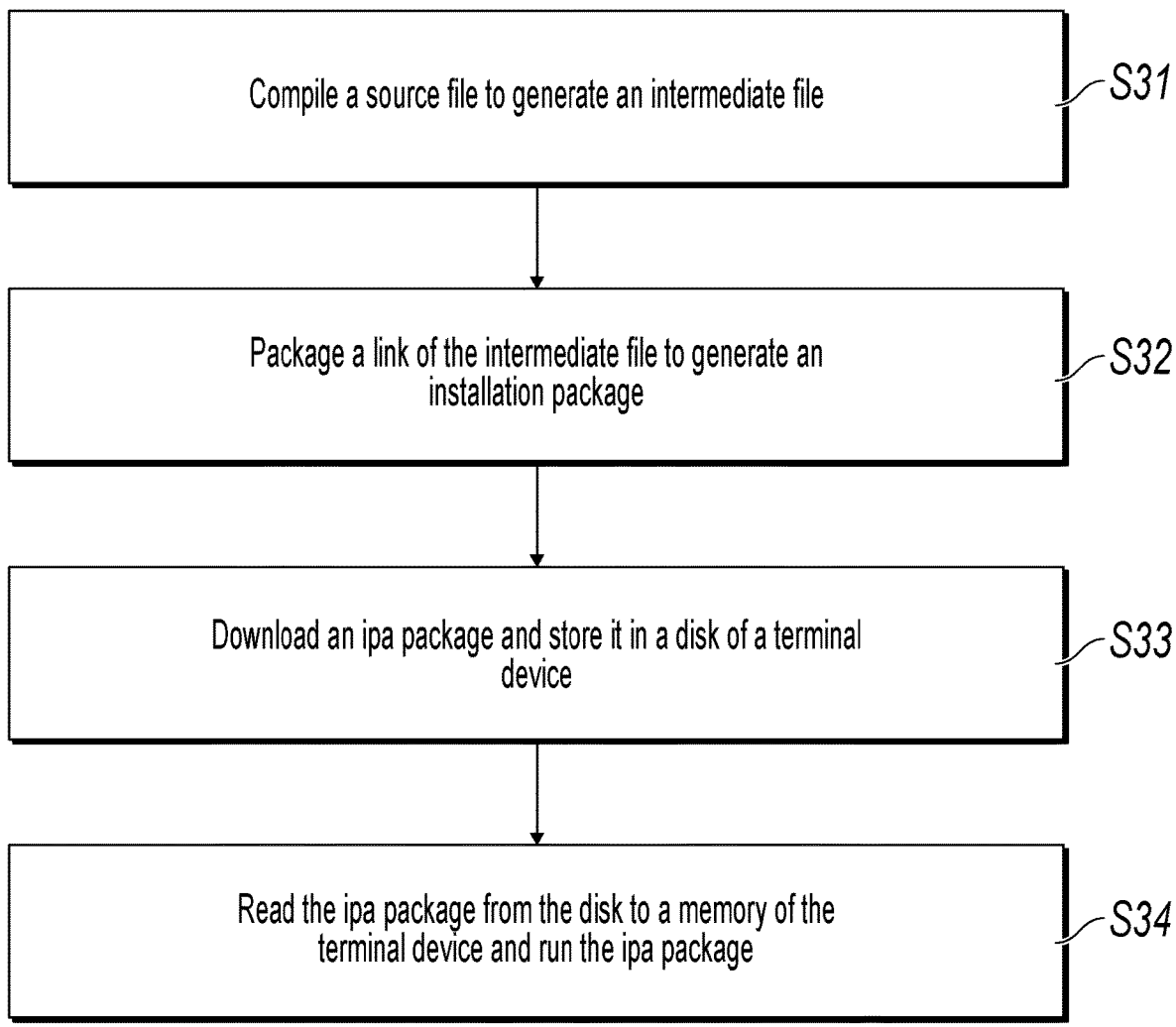
FIG. 3 is a schematic flowchart illustrating an APP running method, according to another implementation of the present disclosure.

To better distinguish the present disclosure from the existing technology, FIG. 3 shows a schematic flowchart of running an APP in the existing technology. Referring to FIG. 3, in the existing technology, an installation package is generated in two steps: compile a source file to generate an intermediate file (.o file) (S31), and then package a link of the intermediate file to generate the installation package (S32). For example, in the iOS system, the installation package can be referred to as an ipa package. After the compiling and link packaging, the ipa package includes a class corresponding to an APP. Afterwards, the ipa package can be placed in an APP store for a user to download. After download, the ipa package is stored in a disk of a terminal device (S33). When the APP runs, the ipa package is read from the disk to a memory of the terminal device for running (S34). Therefore, normal running of the APP is implemented. The ipa package is generally large, and therefore large amount of resources are needed for download and storage.

Different from the existing technology, compiling and link packaging of the original file are not needed in this implementation, class description file is used instead. The class description file is a text file. Compared with the existing ipa package, the size of the class description file is small, so as to reduce resources for download and storage.

S13. When the APP runs, obtain the class description file from the installation package, and generate a class based on the class description file.

When the downloaded installation package is the compressed installation package, the installation package can first be decompressed when the installation packaged is used, so as to obtain information such as the class description file. When the downloaded installation package is not compressed, information such as the class description file can be directly obtained from the installation package.

To ensure normal running of the APP, the class included in the APP needs to be generated. In the existing technology, the class can be generated by compiling and packaging the source file, so that the ipa package stored in the disk includes the class. When the APP runs, the class can be directly obtained from the disk to normally run the APP.

In this implementation, to reduce the size of the installation package, the installation package includes the class description file instead of the class. Therefore, to ensure normal running of the APP, the class needs to be first generated based on the class description file.

For example, after downloading the installation package, the user can store the installation package in the disk of the terminal device. When the APP runs, the class description file in the installation package can be read from the disk to a memory, where the class is generated based on the class description file.

Figure 4:
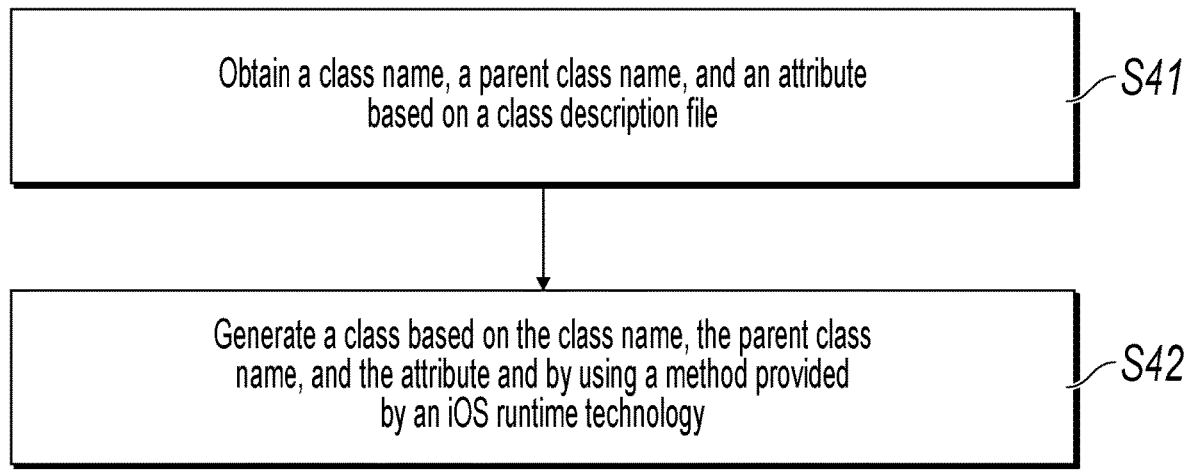
FIG. 4 is a schematic flowchart of generating a class based on a class description file, according to an implementation of the present disclosure.

In some implementations, referring to FIG. 4, a procedure of generating the class based on the class description file may include the following steps.

S41. Obtain a class name, a parent class name, and an attribute based on the class description file.

For example, the class description file includes a class name and attribute description of a class waiting to be generated. For example, the class name (className) is cashier (MERCHANTAPPOperator), and the attribute description includes a cashier ID (operatorId), a cashier name (operatorName), a shop name (shopName) of the cashier, etc. Therefore, the class name and the attribute description can be obtained from the class description file.

After the attribute description is obtained, an attribute can be created based on the attribute description. For example, an attribute variable (ivar), an accessor (property), and a pointer (IMP) can be directly created based on the attribute description.

If the class description file includes a corresponding parent class name of the class name, the parent class name can be directly obtained from the class description file. If the class description file does not include a corresponding parent class name of the class name, the parent class name can be created and returned based on a parent class name creation rule and the class name, to obtain the parent class name.

S42. Generate the class based on the class name, the parent class name, and the attribute and by using a method provided by an iOS runtime technology.

The iOS runtime technology provides a plurality of methods for creating the class. For example, one method is objc_allocateClassPair(Class superclass, const char *name, size_textraBytes).

Note: The first parameter superclass is a class object of a parent class, the second parameter name is a class name, and the third parameter is an additionally allocated byte, which is generally 0.

The parent class name and the class name are used in the parameters of the method. In addition, the attribute is used when the method is performed, to create the class based on the parent class name, the class name, and the attribute and by using the earlier described method.

In this implementation, the installation package includes the class description file, and the size of the class description file is smaller than that of the class. Therefore, compared with an existing method of including a class directly in an installation package, including the class description file in the installation package can reduce the size of the APP installation package and reduce resource overheads.

Figure 5:
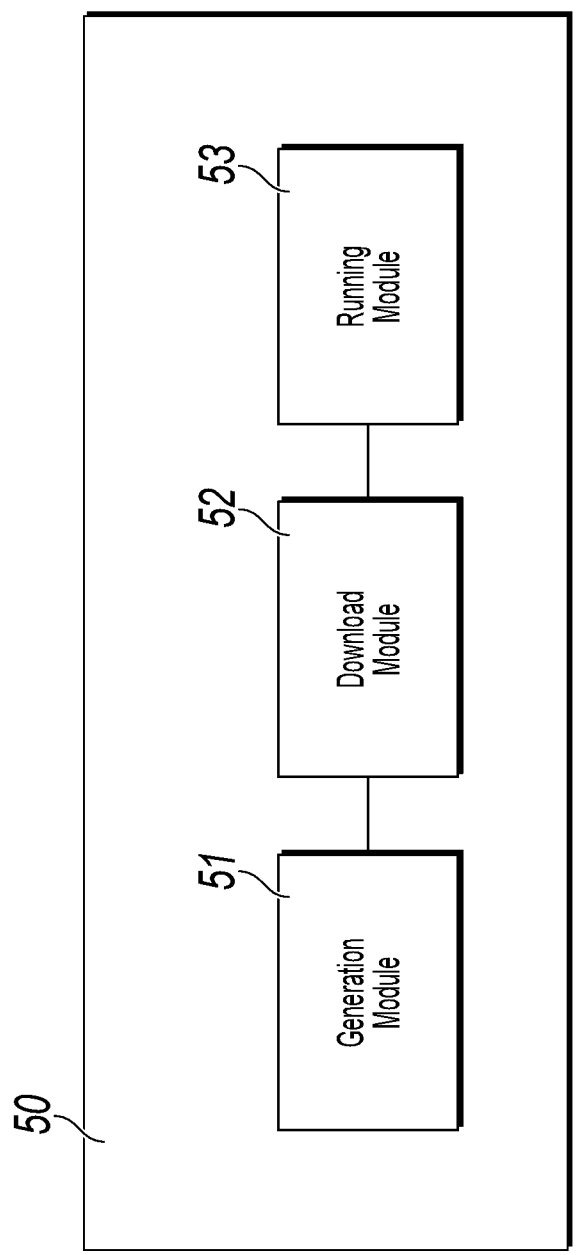
FIG. 5 is a schematic structural diagram of an APP running apparatus, according to an implementation of the present disclosure.

FIG. 5 is a schematic structural diagram of an APP running apparatus, according to an implementation of the present disclosure. The apparatus 50 includes a generation module 51, a download module 52, and a running module 53.

The generation module 51 is configured to: generate a class description file based on an original file of an APP, and place the class description file in an installation package, the class description file is a text file used for class description, and the size of the class description file is smaller than the size of a corresponding class.

For example, the original file includes a header file (.h file) and a source file (.m file).

The class description file is a text file and used to describe related information of a class. Classes are basic information in computer programming. The size of the class description file is smaller than the size of a corresponding class.

For example, a class name (className) is cashier (MERCHANTAPPOperator), and the cashier has class description (classDescription). For example, the class description includes attribute description, which includes a cashier ID (operatorId), a cashier name (operatorName), a shop name (shopName) of the cashier, etc.

Optionally, the generation module is configured to generate a class description file based on an original file of an APP, which includes: performing format conversion based on a predetermined script, and converting the original file of the APP into the class description file.

For example, in the iOS system, a pre-compiled script can be used to convert the original file into the class description file (.plist file). Content needed in the class description file can be found in the original file, but the original file and the class description file have different formats. Therefore, the script can be pre-compiled to implement conversion between the original file and the class description file.

In addition, after the class description file is generated, it can be stored in a predetermined directory, for example, resource bundle.

After the class description file is generated, it can be placed in the installation package for a user to download and install.

Figure 6:
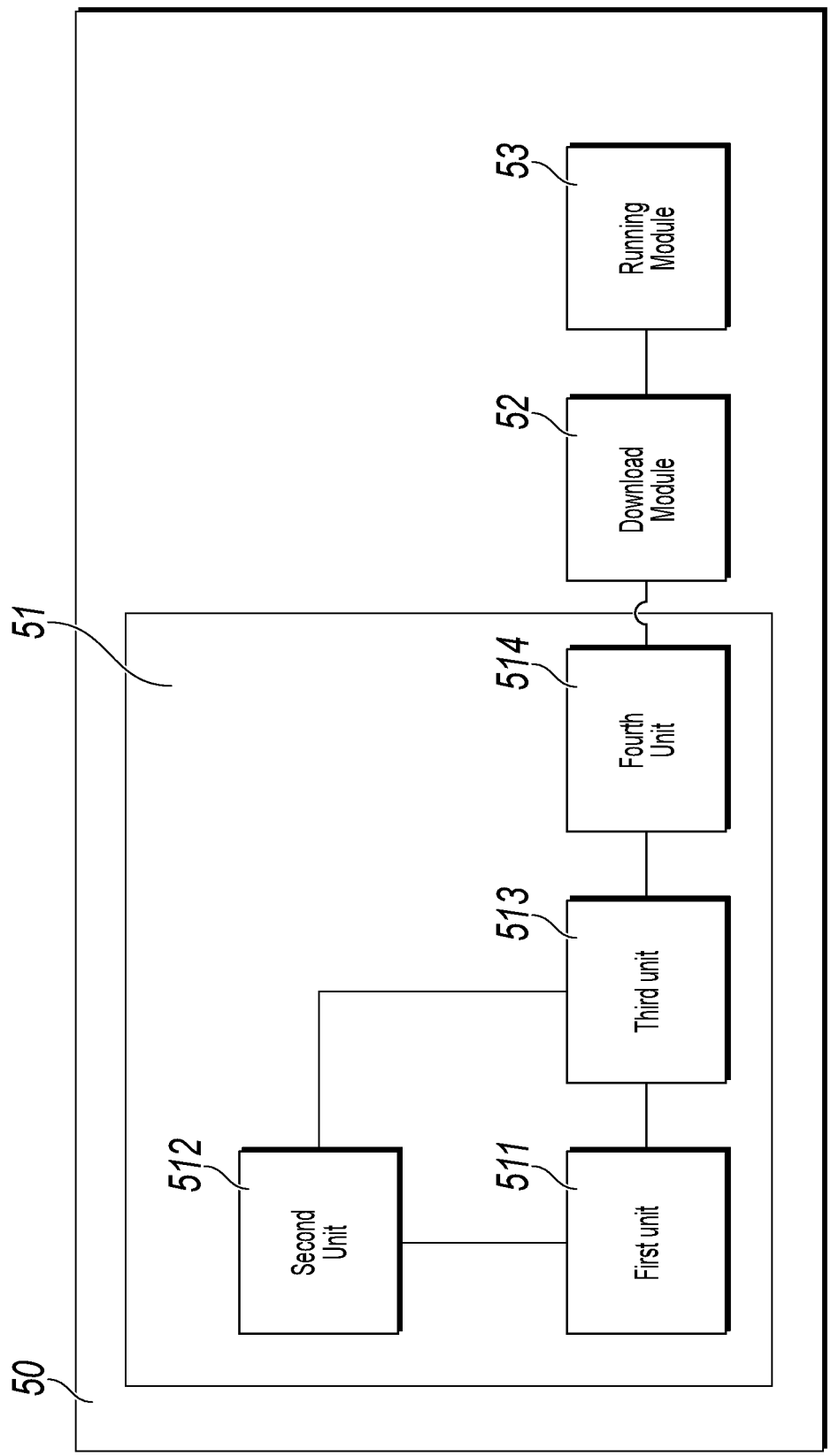
FIG. 6 is a schematic structural diagram of an APP running apparatus, according to another implementation of the present disclosure.

In some implementations, referring to FIG. 6, the generation module 51 includes a first unit 511, a second unit 512, and a third unit 513.

The first unit 511 is configured to generate the class description file based on the header file and the source file.

For a generation procedure, refer to the earlier described related description. Details are not described here again.

The second unit 512 is configured to delete the source file.

The third unit 513 is configured to: place the header file and the class description file in the installation package for the user to download, after the source file is deleted.

Because the class description file and the header file are both small, and the obtained installation package is also small, the user can directly download the installation package from the APP store.

Optionally, the generation module 51 further includes: a fourth unit 514, configured to compress the installation package, so that the user downloads a compressed installation package.

To further reduce the size of the installation package, the obtained installation package can be further compressed.

For example, the compressed installation package is presented in the APP store, and the user can download the compressed installation package.

The download module 52 is configured to download the installation package before a user runs the APP.

For example, the user can download the installation package of the APP from the APP store, and the installation package includes the class description file.

Different from the existing technology, compiling and link packaging of the original file are not needed in this implementation, but the class description file is used instead. The class description file is a text file. Compared with the existing ipa package, the size of the class description file is small, so as to reduce resources for download and storage.

The running module 53 is configured to: obtain the class description file from the installation package when the APP runs, and generate a class based on the class description file.

When the downloaded installation package is the compressed installation package, the installation package can be first decompressed when the installation packaged is used, so as to obtain information such as the class description file. When the downloaded installation package is not compressed, information such as the class description file can be directly obtained from the installation package.

To ensure normal running of the APP, the class included in the APP needs to be generated. In the existing technology, the class can be generated by compiling and packaging the source file, so that the ipa package stored in the disk includes the class. When the APP runs, the class can be directly obtained from the disk, to implement normal running of the APP.

In this implementation, to reduce the size of the installation package, the installation package includes the class description file instead of the class. Therefore, to ensure normal running of the APP, the class needs to be first generated based on the class description file.

For example, after downloading the installation package, the user can store the installation package in the disk of the terminal device. When the APP runs, the class description file in the installation package can be read from the disk to a memory, where the class is generated based on the class description file.

In some implementations, the running module 53 is configured to generate a class based on the class description file, which includes: obtaining a class name, a parent class name, and an attribute based on the class description file;

and generating the class based on the class name, the parent class name, and the attribute and by using a method provided by an iOS runtime technology.

For example, the class description file includes a class name and attribute description of a class waiting to be generated. For example, the class name (className) is cashier (MERCHANTAPPOperator), and the attribute description includes a cashier ID (operatorId), a cashier name (operatorName), a shop name (shopName) of the cashier, etc. Therefore, the class name and the attribute description can be obtained from the class description file.

After the attribute description is obtained, an attribute can be created based on the attribute description. For example, an attribute variable (ivar), an accessor (property), and a pointer (IMP) can be directly created based on the attribute description.

If the class description file includes a corresponding parent class name of the class name, the parent class name can be directly obtained from the class description file. If the class description file does not include a corresponding parent class name of the class name, the parent class name can be created and returned based on a parent class name creation rule and the class name, to obtain the parent class name.

The iOS runtime technology provides a plurality of methods for creating the class. For example, one method is objc_allocateClassPair(Class superclass, const char *name, size_textraBytes).

Note: The first parameter superclass is a class object of a parent class, the second parameter name is a class name, and the third parameter is an additionally allocated byte, which is generally 0.

The parent class name and the class name are used in the parameters of the method. In addition, the attribute is used when the method is performed, to create the class based on the parent class name, the class name, and the attribute and by using the earlier described method.

In this implementation, the installation package includes the class description file, and the size of the class description file is smaller than that of the class. Therefore, compared with an existing method of including a class directly in an installation package, including the class description file in the installation package can reduce the size of the APP installation package and reduce resource overheads.

It is worthwhile to note that in the descriptions of the present disclosure, the terms "first" and "second" are merely intended for a purpose of description, and shall not be understood as an indication or implication of relative importance. In addition, in the descriptions of the present disclosure, "a plurality of" means "at least two" unless otherwise stated.

Descriptions about any process or method described in a flowchart or in another way here can be understood as follows: one or more modules, segments, or parts of code of an executable instruction that is used to implement a specific logical function or operation step are included, the scope of preferred implementations of the present disclosure includes other implementation, and functions can be performed in a sequence other than a shown or discussed sequence, including in a basically simultaneous way or a reverse sequence according to the functions concerned. This should be understood by a person skilled in the art of the implementations of the present disclosure.

It should be understood that parts in the present disclosure can be implemented using hardware, software, firmware, or a combination of them. In the earlier described implementations, a plurality of steps or methods can be implemented using software or firmware that is stored in a memory and that is executed by an appropriate instruction execution system. For example, if hardware is used for implementation, being similar to another implementation, any one or a combination of the following well-known technologies in the art can be used for implementation: a discreet logic circuit having a logic gate circuit that is used to implement a logical function for a data signal, an APP-specific integrated circuit having an appropriate combinatorial logic circuit, a programmable gate array (PGA), a field programmable gate array (FPGA), or the like.

A person of ordinary skill in the art can understand that all or some of the steps of the method implementations can be implemented by a computer implemented program instructing relevant hardware. The program can be stored in a computer readable storage medium. When the program runs, one or a combination of the steps of the method implementations is performed.

In addition, functional units in the implementations of the present disclosure can be integrated into one processing module, or each of the units can exist alone physically, or two or more units can be integrated into one module. The integrated module can be implemented in a form of hardware, or can be implemented in a form of a software functional module. When the integrated module is implemented in the form of a software functional module and sold or used as an independent product, the integrated module can be stored in a computer-readable storage medium.

The earlier described storage medium can be a read-only memory, a magnetic disk or an optical disk.

In descriptions of the present specification, descriptions about such reference terms as "an implementation", "some implementations", "an example", "a specific example", and "some examples" mean that specific features, structures, materials, or characteristics described with reference to the implementations or examples are included in at least one implementation or example of the present disclosure. In the present specification, the earlier described example expressions of the terms are not necessarily with respect to a same implementation or example. In addition, the described specific features, structures, materials, or characteristics can be combined in a proper way in any one or more of the implementations or examples.

Although the implementations of the present disclosure are shown and described above, it can be understood that the earlier described implementations are examples, and cannot be construed as a limitation on the present disclosure. Within the scope of the present disclosure, a person of ordinary skill in the art can make changes, modifications, replacements, and variations to the earlier described implementations.

Figure 7:
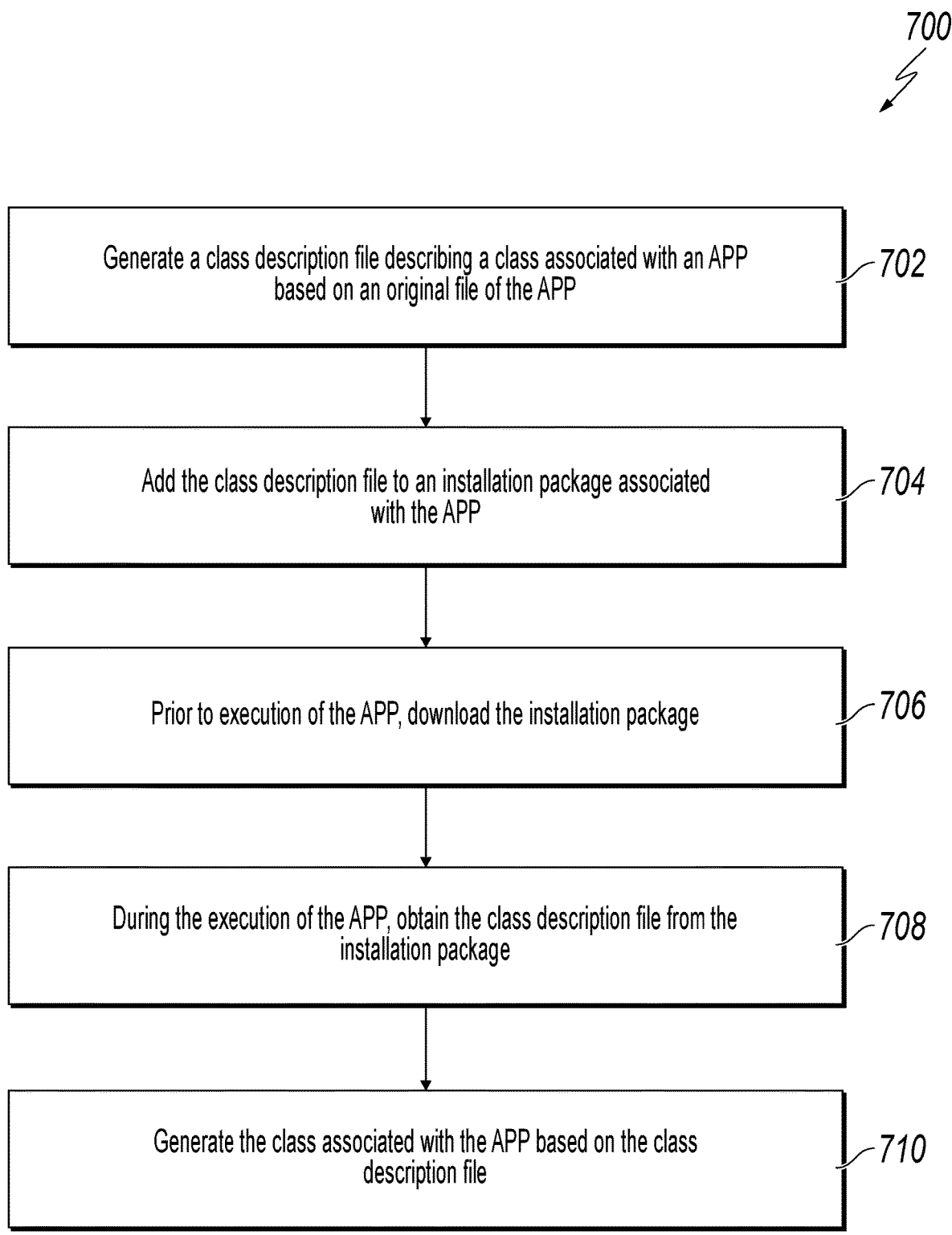
FIG. 7 is a flowchart illustrating an example of a computer-implemented method for running an APP, including generating a class associated with the APP based on a class description file, according to an implementation of the present disclosure.

FIG. 7 is a flowchart illustrating an example of a computer-implemented method 700 for running an APP, including generating a class associated with the APP based on a class description file, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a class description file describing a class associated with an APP is generated based on an original file of the APP. As an example, the generation module 51 can generate the class description file based on an original file of an APP. The original file can include, for example, at least one of a header file (for example, naming the application) and a source file (for example, containing the source code or object code for the application).

In some implementations, generating the class description file can include performing a format conversion on the original file of the APP to generate the class description file. The format conversion can be performed, for example, using a predetermined script. The script can include rules, for example, that determine a class from a corresponding piece of source code.

In some implementations, generating the class description file can include obtaining (for example, from the from the class description file) a class name, a parent class name, and an attribute. Using a method provided by an iOS runtime technology, for example, the class can be generated based on the class name, the parent class name, and the attribute. From 702, method 700 proceeds to 704.

At 704, the class description file is added to an installation package associated with the APP. For example, the generation module 51 can place the class description file in an installation package. The class description file can be, for example, a text file used for class description. The class description file can be, for example, a text file, and a size of the class description file can typically be less than a size of the class. The installation package can be created, for example, to make available, for use on a user's computer, a package for installing the APP.

In some implementations, generating the class description file and placing the class description file in the installation package can include generating the class description file based on the header file and the source file. In some implementations, the source file can be deleted, such as if it is known that the source file is no longer needed. After the source file is deleted, the header file and the class description file can be placed in the installation package for download by the user.

In some implementations, method 700 can further include compressing the installation package after the header file and the class description file are placed in the installation package. When the installation package is received, for example, the compressed information can be de-compressed. From 704, method 700 proceeds to 706.

At 706, prior to execution of the APP, the installation package is downloaded. As an example, the download module 52 can download the installation package before a user runs the APP. From 706, method 700 proceeds to 708.

At 708, during the execution of the APP, the class description file is obtained from the installation package. For example, the running module 53 can obtain the class description file from the installation package when the APP runs. From 708, method 700 proceeds to 710.

At 710, the class associated with the APP is generated based on the class description file. As an example, the running module 53 can generate a class based on the class description file. After 710, method 700 stops.

The present disclosure describes techniques for more efficient download and execution of APPs. For example, a class description file can be generated based on an original file of an APP. The size of the class description file can typically be smaller than the size of a corresponding class. The class description file can be placed in an installation package that is downloaded before a user runs the APP. When the APP runs, the class description file can be obtained from the installation package, and a class can be generated that is based on the class description file. In this way, as compared to convention techniques which include the class directly in the installation package, techniques in the present disclosure can instead include the class description file in the installation package. This can reduce the size of the APP installation package, for example, reducing resource overheads.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    generating a class description file describing a class associated with an application (APP) based on an original file of the APP wherein generating the class description file includes performing, using a predetermined script, a format conversion on the original file of the APP to generate the class description file having a smaller size than the original file of the APP;
    adding the class description file to an installation package associated with the APP;
    prior to execution of the APP, downloading the installation package;
    in response to receiving a request to execute the APP, obtaining the class description file from the installation package;
    generating the class associated with the APP based on the class description file; and
    executing the APP using the class generated based on the class description file.

2. The computer-implemented method of claim 1, wherein generating the class includes:
    obtaining, from the class description file, a class name, a parent class name, and an attribute; and
    generating, using a method provided by an iOS runtime technology, the class based on the class name, the parent class name, and the attribute.

3. The computer-implemented method of claim 1, wherein the original file includes at least one of a header file and a source file.

4. The computer-implemented method of claim 3, wherein generating the class description file and placing the class description file in the installation package include:
    generating the class description file based on the header file and the source file;
    deleting the source file; and
    after the source file is deleted, placing the header file and the class description file in the installation package for download by the user.

5. The computer-implemented method of claim 4, further comprising compressing the installation package after the header file and the class description file are placed in the installation package.

6. The computer-implemented method of claim 1, wherein the class description file is a text file, and wherein a size of the class description file is less than a size of the class.

7. A non-transitory, computer-readable medium storing one or more instructions executable by a computer system to perform operations comprising:
- generating a class description file describing a class associated with an application (APP) based on an original file of the APP wherein generating the class description file includes performing, using a predetermined script, a format conversion on the original file of the APP to generate the class description file having a smaller size than the original file of the APP;
- adding the class description file to an installation package associated with the APP;
- prior to execution of the APP, downloading the installation package;
- in response to receiving a request to execute the APP, obtaining the class description file from the installation package;
- generating the class associated with the APP based on the class description file; and
- executing the APP using the class generated based on the class description file.

8. The non-transitory, computer-readable medium of claim 7, wherein generating the class includes:
- obtaining, from the class description file, a class name, a parent class name, and an attribute; and
- generating, using a method provided by an iOS runtime technology, the class based on the class name, the parent class name, and the attribute.

9. The non-transitory, computer-readable medium of claim 7, wherein the original file includes at least one of a header file and a source file.

10. The non-transitory, computer-readable medium of claim 9, wherein generating the class description file and placing the class description file in the installation package include:
- generating the class description file based on the header file and the source file;
- deleting the source file; and
- after the source file is deleted, placing the header file and the class description file in the installation package for download by the user.

11. The non-transitory, computer-readable medium of claim 10, the operations further comprising compressing the installation package after the header file and the class description file are placed in the installation package.

12. The non-transitory, computer-readable medium of claim 7, wherein the class description file is a text file, and wherein a size of the class description file is less than a size of the class.

13. A computer-implemented system, comprising:
- one or more computers; and
- one or more computer memory devices interoperably coupled with the one or more computers and having tangible, non-transitory, machine-readable media storing one or more instructions that, when executed by the one or more computers, perform one or more operations comprising:
  - generating a class description file describing a class associated with an application (APP) based on an original file of the APP wherein generating the class description file includes performing, using a predetermined script, a format conversion on the original file of the APP to generate the class description file having a smaller size than the original file of the APP;
  - adding the class description file to an installation package associated with the APP;
  - prior to execution of the APP, downloading the installation package;
  - in response to receiving a request to execute the APP, obtaining the class description file from the installation package;
  - generating the class associated with the APP based on the class description file; and
  - executing the APP using the class generated based on the class description file.

14. The computer-implemented system of claim 13, wherein generating the class includes:
- obtaining, from the class description file, a class name, a parent class name, and an attribute; and
- generating, using a method provided by an iOS runtime technology, the class based on the class name, the parent class name, and the attribute.

15. The computer-implemented system of claim 13, wherein the original file includes at least one of a header file and a source file.

16. The computer-implemented system of claim 15, wherein generating the class description file and placing the class description file in the installation package include:
- generating the class description file based on the header file and the source file;
- deleting the source file; and
- after the source file is deleted, placing the header file and the class description file in the installation package for download by the user.

17. The computer-implemented system of claim 16, the operations further comprising compressing the installation package after the header file and the class description file are placed in the installation package.

* * * * *